United States Patent
Li et al.

(10) Patent No.: US 10,687,607 B2
(45) Date of Patent: Jun. 23, 2020

(54) BUFFER STRUCTURE, FALL PROTECTION DEVICE AND CONTROL METHOD THEREOF AND MOBILE TERMINAL

(71) Applicants: BOE Technology Group Co., Ltd., Beijing (CN); Hefei BOE Optoelectronics Technology Co., Ltd., Hefei (CN)

(72) Inventors: Peng Li, Beijing (CN); Zhengwei Zhu, Beijing (CN); Jiong Huang, Beijing (CN)

(73) Assignees: BOE Technology Group Co., Ltd., Beijing (CN); Hefei BOE Optoelectronics Technology Co., Ltd., Hefei, Anhui (CN)

( * ) Notice: Subject to any disclaimer, the term of this patent is extended or adjusted under 35 U.S.C. 154(b) by 55 days.

(21) Appl. No.: 16/031,223

(22) Filed: Jul. 10, 2018

(65) Prior Publication Data
US 2019/0110582 A1  Apr. 18, 2019

(30) Foreign Application Priority Data

Oct. 16, 2017 (CN) .......................... 2017 1 0959945

(51) Int. Cl.
*A45F 5/00* (2006.01)
*G01P 15/00* (2006.01)
(Continued)

(52) U.S. Cl.
CPC ................ *A45F 5/00* (2013.01); *A45C 11/00* (2013.01); *F16F 3/12* (2013.01); *G01P 15/0891* (2013.01);
(Continued)

(58) Field of Classification Search
CPC ........ A45F 5/00; A45F 11/00; G01P 15/0891; G01P 15/00; F16F 3/12; G05B 15/02; A45C 2011/002; A45C 2200/0525
(Continued)

(56) References Cited

U.S. PATENT DOCUMENTS

| 7,059,182 B1 | 6/2006 | Ragner |
| 2010/0164152 A1 | 7/2010 | Li |

(Continued)

FOREIGN PATENT DOCUMENTS

| CN | 2860857 Y | 1/2007 |
| CN | 101399860 A | 4/2009 |
| CN | 101765346 A | 6/2010 |
| CN | 202856834 U | 4/2013 |
| CN | 204291094 U | 4/2015 |

(Continued)

OTHER PUBLICATIONS

Sep. 25, 2019—(CN) First Office Action Appn 201710959945.X with English Translation.
(Continued)

*Primary Examiner* — Michael J Brown
(74) *Attorney, Agent, or Firm* — Banner & Witcoff, Ltd.

(57) ABSTRACT

A buffer structure, a fall protection device, a control method of the fall protection device, and a mobile terminal are provided. The buffer structure includes a connecting rod, a counterweight which is in a rotatable connection with the connecting rod, and a buffer component connected with the counterweight. In a case that an object to be protected is in a state of falling, the counterweight automatically turns according to a falling direction of the object to be protected, and the buffer component is turned to a gravity direction under driving of the counterweight.

16 Claims, 5 Drawing Sheets

(51) Int. Cl.
*F16F 3/12* (2006.01)
*G05B 15/02* (2006.01)
*G01P 15/08* (2006.01)
*A45C 11/00* (2006.01)

(52) U.S. Cl.
CPC ........ *G05B 15/02* (2013.01); *A45C 2011/002* (2013.01); *A45F 2200/0525* (2013.01); *G01P 15/00* (2013.01)

(58) Field of Classification Search
USPC ........................................................ 700/275
See application file for complete search history.

(56) References Cited

U.S. PATENT DOCUMENTS

2015/0108030 A1* 4/2015 Yin ................. H04M 1/185
 206/521
2015/0316116 A1* 11/2015 Lu .................. F16F 7/1022
 267/140.13

FOREIGN PATENT DOCUMENTS

| CN | 103237097 B | 11/2015 |
|----|-------------|---------|
| CN | 106911825 A | 6/2017 |
| CN | 206236089 U | 6/2017 |
| CN | 107094194 A | 8/2017 |

OTHER PUBLICATIONS

Apr. 3, 2020—(CN) Second Office Action Appn 201710959945.X with English Translation.

* cited by examiner

BUFFER STRUCTURE, FALL PROTECTION DEVICE AND CONTROL METHOD THEREOF AND MOBILE TERMINAL

This application claims priority to and the benefit of Chinese Patent Application No. 201710959945.X filed on Oct. 16, 2017, which application is incorporated herein in its entirety.

TECHNICAL FIELD

Embodiments of the present disclosure relate to a buffer structure, a fall protection device, a control method of the fall protection device and a mobile terminal.

BACKGROUND

With the development of society, terminal products such as mobile, tablet PC and NB (notebook) become essential in daily life. A reliability test of each of the above mentioned products includes a whole machine falling test; in the process of using each of the above mentioned products by a user, the product may fall inadvertently; and the falling of the product often leads to damage to a whole machine or an internal module of the product. For example, the damage to the whole machine mainly includes: abnormal display (AD) of a display device (such as an LCD) caused by fragments or caused by the damage to an module component, and the damage to a whole machine system (for example, the connectors or components of the system become loose or fall off). Therefore, it is necessary to provide a fall protection design to the whole machine (or provide the fall protection design to the whole machine and the internal module).

In current designs of mobile terminal fall protection systems, for example, a design of a rod ejection system or the like has disadvantages such as a poor buffering effect, and being easy to form a stress concentration to damage the whole machine, a design of a jetting electronic device or the like has disadvantages such as poor buffering continuation capacity, being nonreusable and relatively high cost.

Therefore, in the current designs of mobile terminal fall protection systems, the buffering effect in the process of fall protection is poor, which results in the poor effect of protecting the whole machine and the internal module of the mobile terminal. In addition, some technical solutions further have disadvantages such as a poor buffering continuation capacity, being nonreusable and relatively high cost.

SUMMARY

Embodiments of the present disclosure provide a buffer structure, a fall protection device, a control method of the fall protection device and a mobile terminal.

In a first aspect, at least one embodiment of the present disclosure provides a buffer structure, and the buffer structure includes: a connecting rod, a counterweight which is in a rotatable connection with the connecting rod, and a buffer component connected with the counterweight.

For example, the connecting rod is in the rotatable connection with the counterweight through a steering ball head and a ball seat which matches the steering ball head.

For example, the buffer component includes an elastic block and a buffer spring, an end of the buffer spring is connected with the elastic block, and another end of the buffer spring is connected with the counterweight.

For example, the connecting rod is an extendable and retractable connecting rod.

In a second aspect, at least one embodiment of the present disclosure provides a fall protection device, and the fall protection device includes: the buffer structure described in any one of the above embodiments; a housing provided with a concave cavity for holding an object to be protected and provided with a guiding cavity, in which the buffer structure is arranged in an extendable and retractable manner, so that the counterweight and the buffer component in the buffer structure are capable of extending to an outside of the housing along the guiding cavity; a control module on the housing; a detection module which is used for real-time detecting of an acceleration, is at the housing and is electrically connected with the control module; and an electrically controlled limit structure which is electrically connected with the control module and is configured to lock the buffer structure by limiting a position of the buffer structure or to release the buffer structure under control of the control module.

For example, an outer edge of the housing is provided with a bent portion, and the bent portion is provided with the buffer structure.

For example, the housing has a rectangular structure, and each of four corners of rectangular structure is provided with the buffer structure.

For example, the connecting rod of the buffer structure is an extendable and retractable connecting rod; and an end, away from the counterweight, of the connecting rod is fixedly connected with the guiding cavity.

For example, the electrically controlled limit structure further includes an electromagnet, a limit spring and a limit block, an end of the limit spring is connected with the electromagnet, and another end of the limit spring is connected with the limit block.

For example, the limit block is provided with a ferromagnet which matches the electromagnet.

For example, the buffer component includes an elastic block and a buffer spring, an end of the buffer spring is connected with the elastic block, and another end of the buffer spring is connected with the counterweight; the elastic block of the buffer structure is provided with a locking groove which allows the limit block to be inserted to lock the buffer structure by limiting the position of the buffer structure.

For example, in the buffer structure, the connecting rod is in the rotatable connection with the counterweight through a steering ball head and a ball seat which matches the steering ball head.

For example, the housing is further provided with a receiving groove communicating with the guiding cavity, and the limit block is arranged in the receiving groove in an extendable and retractable manner under action of the limit spring.

In a third aspect, at least one embodiment of the present disclosure further provides a fall protection control method, the fall protection control method is used for the fall protection device described in any one of the above embodiments, and the method includes: detecting an acceleration in real time and determining whether the fall protection device is in a state of falling according to the acceleration, in which in a case that the acceleration of the fall protection device is greater than or equal to a preset threshold, it is determined that the fall protection device is in the state of falling; and in a case that the fall protection device is in the state of falling, controlling the electrically controlled limit structure to release the buffer structure, so that the counterweight and the buffer component in the buffer structure extend to the outside of the housing, and the buffer component of the buffer structure is turned to the gravity direction under driving of the counterweight.

For example, the threshold is the gravity acceleration.

In a fourth aspect, at least one embodiment of the present disclosure further provides a mobile terminal, the mobile terminal includes a mobile terminal body and the fall protection device described in any one of the above embodiments, and the mobile terminal body includes a portion in the concave cavity in the fall protection device.

BRIEF DESCRIPTION OF THE DRAWINGS

In order to clearly illustrate the technical solution of the embodiments of the disclosure, the drawings of the embodiments will be briefly described. It is apparent that the described drawings are only related to some embodiments of the present disclosure and thus are not limitative of the present disclosure.

DETAILED DESCRIPTION

In order to make objects, technical details and advantages of embodiments of the disclosure clear, the technical solutions of the embodiments will be described in a clearly and fully understandable way in connection with the related drawings. It is apparent that the described embodiments are just a part but not all of the embodiments of the disclosure. Based on the described embodiments herein, those skilled in the art can obtain, without any inventive work, other embodiment(s) which should be within the scope of the disclosure.

Figure 1:
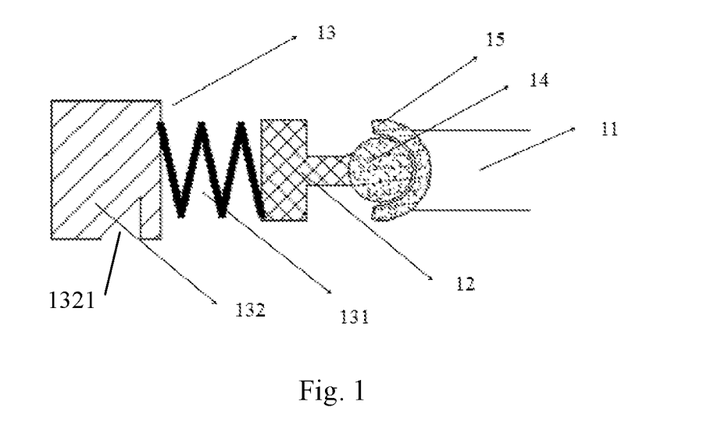
FIG. 1 is a schematic view of a partial structure of a buffer component provided by at least one embodiment of the present disclosure.

With reference to FIG. 1, at least one embodiment of the present disclosure provides a buffer structure 1, and the buffer structure 1 includes: a connecting rod 11, a counterweight (namely an equivalent weight or force) 12 which is in a rotatable connection with the connecting rod 11, and a buffer component 13 connected with the counterweight 12. For example, the buffer component 13 and the connecting rod 11 are located at opposite sides of the counterweight 12, respectively. The buffer component 13 includes a buffer spring 131 and an elastic block 132 connected with the buffer spring 131 (for example, the buffer spring 131 is directly connected with the elastic block 132), and the buffer spring 131 is connected with the counterweight 12 (for example, the buffer spring 131 is directly connected with the counterweight 12). In a case that an object to be protected is in a state of falling, the counterweight 12 automatically turns according to the falling direction of the object to be protected, and the buffer component 13 is turned to the gravity direction under driving of the counterweight 12. In a process that the object to be protected falls to a contacting surface, the buffer component 13 contacts the contacting surface firstly, in this way, the buffer component 13 is used for buffering protection in the process that the object to be protected falls off.

For example, the elastic block 132 of the buffer component 13 is provided with a locking groove 1321; in a case that the buffer structure 1 is in a non-falling state, the locking groove 1321 is jammed by a limit block and the buffer spring 131 is in a shrinkage state; in a case that the buffer structure 1 is in a state of falling, the locking groove 1321 is not jammed by the limit block, and a length of the buffer spring 131 increases so that the buffer spring 131 forces the elastic block 132 to move in a direction away from the counterweight 12.

For example, the connecting rod 11 is connected with the counterweight 12 via a steering ball head 14 and a ball seat 15. For example, a surface, facing the steering ball head 14, of the ball seat 15 is a concave surface which matches the steering ball head 14 to hold the steering ball head 14. In at least one embodiment of the present disclosure, the connecting rod 11 is connected with the ball seat 15 (for example, the connecting rod 11 is directly connected with the ball seat 15), and the counterweight 12 is connected with the steering ball head 14 (for example, the counterweight 12 is directly connected with the steering ball head 14).

For example, the connecting rod 11 has an extendable and retractable structure. For example, in a case that the object to be protected by the buffer structure 1 is in a normal state (at this time the buffer structure is in a non-falling state), the connecting rod 11 is in a shrinkage state, and the buffer spring 131 of the buffer component 13 is also in a shrinkage state. In a case that the object to be protected is in a state of falling (at this time the buffer structure is in a state of falling), the buffer spring 131 pushes the elastic block 132 to move in the direction away from the counterweight 12 (that is the buffer component 13 is ejected), and the connecting rod 11 is stretched due to the driving of the elastic block 132; then the counterweight 12 drives the buffer component 13 to turn in the gravity direction under the action of the gravity of the counterweight 12 (in which process, the counterweight 12 takes the steering ball head 14 as a rotation center); and in the process that the object to be protected falls on the ground, the buffer component 13 contacts the ground firstly and plays a role of buffering.

In at least one embodiment of the present disclosure, in a case that the object to be protected is in the state of falling, a buffering function of the buffer component 13 reduces the instantaneous impact force acted on the object to be protected, so as to protect the object to be protected. For example, in another embodiment, the buffer component 13 is an elastic component with a buffering function other than the buffer spring 131. For example, the elastic block 132 is formed of a flexible material, such as rubber. By forming the elastic block 132 using the flexible material, the object to be protected is well protected.

In at least one embodiment of the present disclosure, the buffer component 13 is in a state of being stuck in the normal state (namely the state of being stuck is a locking state, for example, the locking state is realized by inserting the limit block into the locking groove 1321 of the elastic block 132). In a case that the object to be protected falls off, the buffer component 13 is released and then rotates in the gravity direction of the counterweight 12 with the counterweight 12 under a gravity action of the counterweight 12. At a moment when the object to be protected falls on the ground, the elastic block 132 absorbs impulse generated during the process that the object to be protected falls off, so that the instantaneous impact stress acted on the object to be protected is reduced, in this way, the whole machine and the internal modules of the object to be protected are protected by the elastic block 132. On the other hand, because a contacting area of the elastic block 132 with the ground is larger, the buffer effect is better, and the phenomenon of stress concentration does not appear, and thus the effect of protecting the object to be protected is better.

At least one embodiment of the present disclosure provides a fall protection device, and the fall protection device includes the buffer structure 1 described in any one of the above embodiments.

Figure 2A:
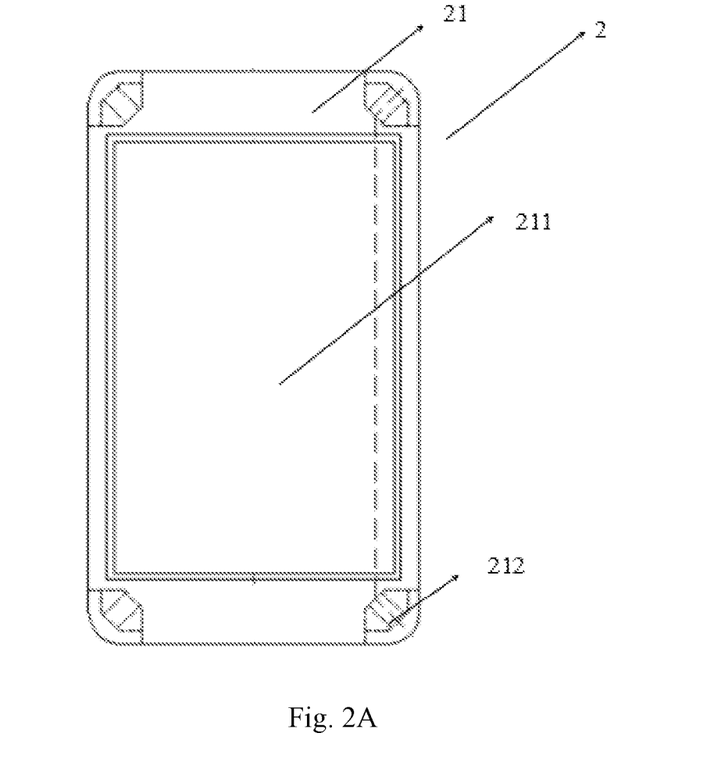
FIG. 2A is a schematic view of a structure of a fall protection device provided by at least one embodiment of the present disclosure.
Figure 2B:
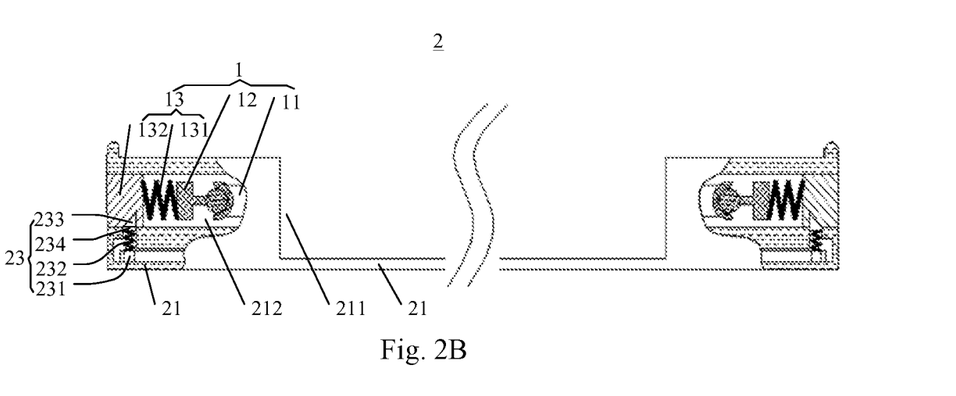
FIG. 2B is a schematic view of a section structure along a dotted line in FIG. 2A.
Figure 3:
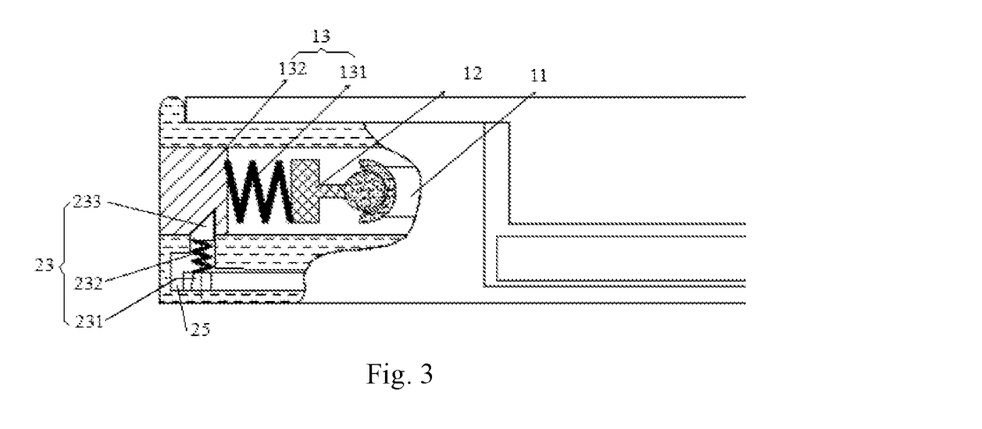
FIG. 3 is a schematic view of a partial section structure of the fall protection device provided by at least one embodiment of the present disclosure, mainly illustrating that the buffer component in the fall protection device is in a state of being locked.

With reference to FIG. 2A to FIG. 3, FIG. 2A is a schematic plan view of a structure of the fall protection device provided by at least one embodiment of the present disclosure; FIG. 2B is a schematic view of a section structure along a dotted line in FIG. 2A; FIG. 3 is a schematic view of a partial section structure of the fall protection device provided by at least one embodiment of the present disclosure, mainly illustrating the buffer component in the fall protection device is locked. As illustrated in FIG. 2A to FIG. 3, the fall protection device 2 includes: the buffer structure 1 described in any one of the above embodiments; a housing 21 provided with a concave cavity 211 for holding an object to be protected and provided with a guiding cavity 212, in which the buffer structure 1 is arranged in an extendable and retractable manner, so that the counterweight 12 and the buffer component 13 in the buffer structure 1 are capable of extending to the outside of the housing 21 along the guiding cavity 212; a control module 22 provided at the housing 21; a detection module 24 which is used for real-time detecting of an acceleration, is provided at the housing 21 and is electrically connected with the control module 22; and an electrically controlled limit structure 23 which is electrically connected with the control module 22 and is controlled by the control module 22 to lock the buffer structure 1 by limiting a position of the buffer structure 1 or to release the buffer structure 1.

For example, as illustrated in FIG. 2B and FIG. 3, in the buffer structure 1, the connecting rod 11 is in the rotatable connection with the counterweight 12 through a steering ball head and a ball seat which matches the steering ball head.

For example, the buffer structure 1 is arranged in the guiding cavity 212 in an extendable and retractable manner via the extendable and retractable connecting rod 11 included in the buffer structure 1; or the connecting rod 11 of the buffer structure 1 is connected with the guiding cavity 212 via other extendable and retractable structure, so that the buffer structure 1 is arranged in the guiding cavity 212.

For example, the connecting rod 11 includes a plurality of movably connected portions so that the connecting rod 11 is extendable and retractable. For example, the connecting rod 11 includes a tube and a sub-connecting rod connected with the tube, and the sub-connecting rod is capable of extending into the tube and protruding from the inside of the tube to make the connecting rod 11 extendable and retractable. The connecting rod 11 in the embodiments of the present disclosure may employ any structure that is extendable and retractable.

For example, an outer edge of the housing 21 is provided with a bent portion, and the bent portion is provided with the buffer structure 1.

For example, as illustrated in FIG. 2A, the fall protection device 2 has a rectangular structure, the object to be protected is in the concave cavity 211, and each of four corners (an example of the above bent portion) of the fall protection device 2 is provided with a guiding cavity 212. The buffer structure 1 is arranged in the guiding cavity 212 via the connecting rod 11 which is extendable and retractable. For example, as illustrated in FIG. 2B and FIG. 3, in a state of non-falling, an end of the connecting rod 11 away from the counterweight 12 is connected with an end of the concave cavity 211 close to the guiding cavity 212, and the elastic block 132 of the buffer component 13 is at an exit of the guiding cavity 212. In a case that the object to be protected (for example, an electronic device) falls off, four corners of the object to be protected are most likely to be damaged in the process of landing on the ground; and by arranging a buffer structure 1 at each of the four corners, the object to be protected is well protected.

For example, the control module 22 is a processor. For example, the processor is an electronic component with a processing function or an assembling of the electronic components with processing functions, such as a central processing unit (CPU), a micro controller unit (MCU), a digital signal processing (DSP), or a programmable logic controller (PLC).

For example, in at least one embodiment of the present disclosure, the electrically controlled limit structure 23 includes an electromagnet 231, a limit spring 232 and a limit block 233, an end of the limit spring 232 is connected with the electromagnet 231, and another end of the limit spring 232 is connected with the limit block 233.

For example, the limit block 233 is formed of a ferromagnetic material, in this way, the limit block 233 and the electromagnet 231 are adsorbed together in a case that the electromagnet 231 is electrified.

For example, the limit block 233 is provided with a ferromagnet 234 which matches the electromagnet 231 to adsorb the limit block 233 in a case that the electromagnet 231 is electrified.

For example, in a case that the buffer component 13 includes an elastic block 132 and a buffer spring 131, an end of the buffer spring 131 is connected with the elastic block 132, and another end of the buffer spring 131 is connected with the counterweight 12 of the buffer structure 1; the elastic block 132 of the buffer structure 1 is provided with a locking groove which allows the limit block 233 to be inserted to lock the buffer structure 1 by limiting the position of the buffer structure 1.

In at least one embodiment of the present disclosure, the housing 21 is further provided with a receiving groove 25 (as illustrated in FIG. 3) communicating with the guiding cavity 212, and the limit block 233 is arranged in the receiving groove 25 in an extendable and retractable manner under the action of the limit spring 232.

In a case that the object to be protected is in a normal state, the limit block 233 of the electrically controlled limit structure 23 is stuck by the locking groove 1321 in the elastic block 132 to lock the elastic block 132, and thus the buffer structure 1 is locked so that the position of the buffer structure 1 is fixed. In a case that the object to be protected is in a state of falling, the electromagnet 231 pulls down the limit block 233 by adsorption, so that the limit block 233 of the electrically controlled limit structure 23 is in the receiving groove 25 to release the elastic block 132 and further to release the buffer structure 1, and then the elastic block 132 is ejected under the elastic force of the buffer spring 131. This structure is simple and easy to be realized.

In at least one embodiment of the present disclosure, the electromagnet 231 is used for driving the limit block 233 having a relatively small volume to move, which requires only a small force, so that a volume of the electromagnet 231 is reduced, and an inner space of the object to be protected is saved.

Figure 2C:
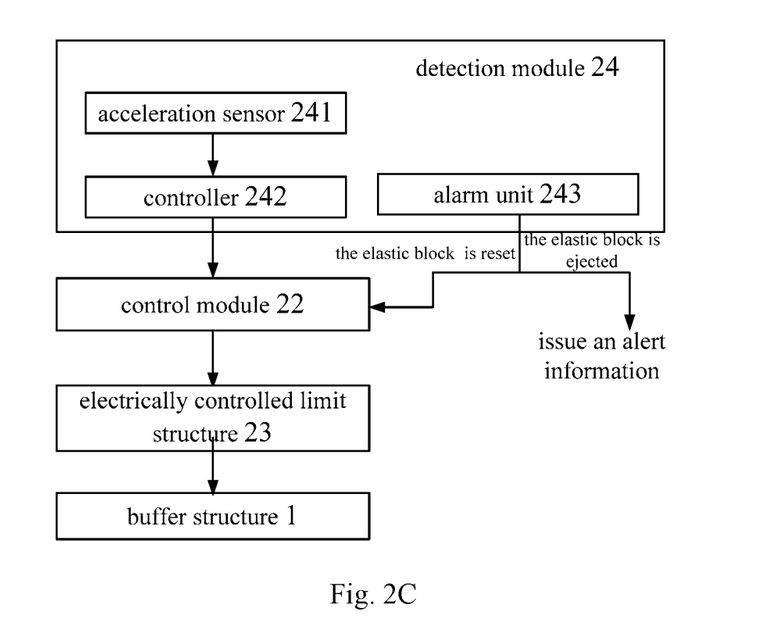
FIG. 2C is a connection block diagram of partial components in the fall protection device provided by at least one embodiment of the present disclosure.

In at least one embodiment of the present disclosure, the detection module 24 includes an acceleration sensor 241, and the acceleration sensor 241 is used for detecting the acceleration of the object to be protected in real time. For example, the detection module 24 further includes a controller 242, which is used for determining whether the object to be protected is in a state of falling or not according to the acceleration detected by the acceleration sensor 241, and outputting a control signal to the control module 22.

In at least one embodiment of the present disclosure, the control module 22 is used for controlling the electrically controlled limit structure 23 to lock the buffer structure 1 or to release the buffer structure 1 in a case that the control module 22 receives the control signal transmitted by the detection module 24. For example, in a case that the control module 22 receives a signal transmitted by the detection module 24 that the object to be protected is in a state of falling, the electrically controlled limit structure 23 is controlled to release the buffer structure 1, so that the counterweight 12 and the buffer component 13 in the buffer structure 1 extend to the outside of the housing 21, and the buffer component 13 of the buffer structure 1 is turned to the gravity direction of the counterweight 12 under driving of the counterweight 12, in this way, in a case that the object to be protected falls on the ground, the elastic block 132 contacts the ground firstly and plays a role of buffering; in a case that the control module 22 receives a signal transmitted by the detection module 24 that the elastic block 132 is to be reset, the limit block 233 in the electrically controlled limit structure 23 is controlled to be ejected to stick the above elastic block 132, so that the elastic block 132 returns to the locking state.

Figure 4:
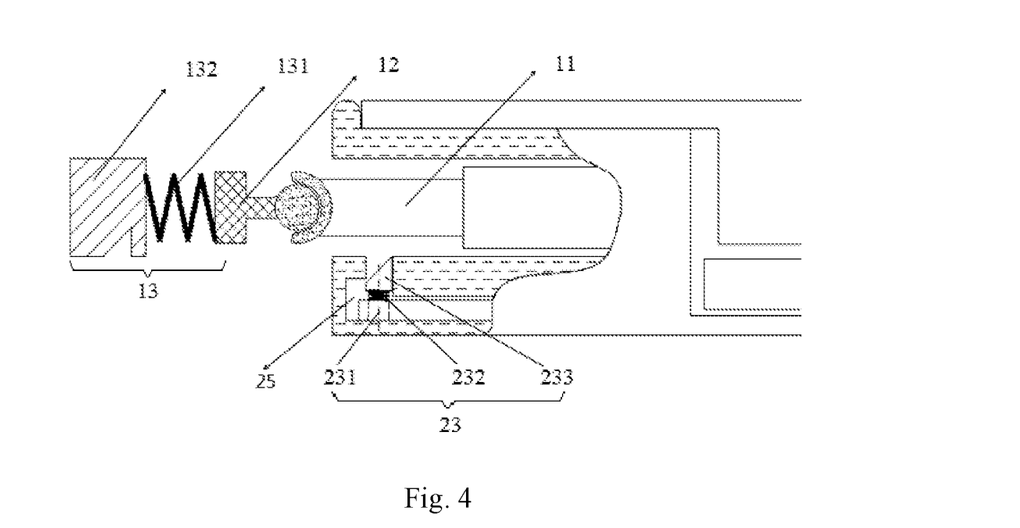
FIG. 4 is a schematic view of a partial section structure of the fall protection device provided by at least one embodiment of the present disclosure, mainly illustrating that the buffer component in the fall protection device is in a state of ejection.
Figure 5:
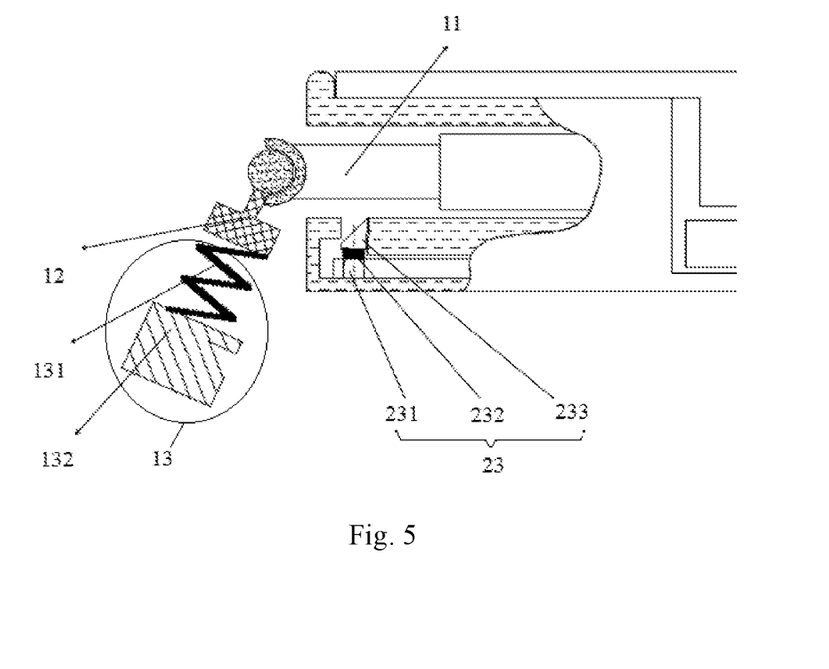
FIG. 5 is a schematic view of a partial section structure of the fall protection device provided by at least one embodiment of the present disclosure, mainly illustrating that the buffer component in the fall protection device is turned to the gravity direction after being ejected.

With reference to FIG. 3, FIG. 4 and FIG. 5, FIG. 3 illustrates that in a normal state, the elastic block 132 of the buffer component 13 is stuck by the limit block 233 of the electrically controlled limit structure 23; FIG. 4 is a schematic view of a partial section structure of the fall protection device 2 provided by at least one embodiment of the present disclosure, mainly illustrating that the buffer component 13 in the fall protection device 2 is in a state of being ejected outside the housing; FIG. 5 is a schematic view of a partial section structure of the fall protection device 2 provided by at least one embodiment of the present disclosure, mainly illustrating that the buffer component 13 in the fall protection device 2 is ejected and turned to the gravity direction.

As illustrated in FIG. 4, in a case that the object to be protected is in a state of falling, the electrically controlled limit structure 23 (for example, an electromagnetic relay) works, in which the electromagnet 231 is energized, and the ferromagnet 231 at the limit block 233 is adsorbed to be pulled down, so that the limit block 233 leaves the locking groove of the elastic block 132, and at this time, the elastic block 132 is ejected from the guiding cavity of the housing of the fall protection device due to the absence of obstruction by the limit block 233.

As illustrated in FIG. 5, the counterweight 12 and the buffer component 13 in the buffer structure 1 extend to the outside of the housing, and the buffer component 13 rotates in the gravity direction under the action of the counterweight 12, so that the elastic block 132 of the buffer component 13 contacts the ground firstly and plays a role of buffering to protect the object to be protected.

For example, in at least one embodiment of the present disclosure, the limit block 233 has a triangular prism structure; for example, in other embodiments, the limit block 233 may also have a cube shape, a cuboid shape, or other shapes, which is not limited in the embodiments of the present disclosure.

For example, as illustrated in FIG. 2C, the detection module 24 further includes an alarm unit 243, which is used to send out alarm information of reminding to reset the elastic block 132 manually in a case that the elastic block 132 of the buffer component 13 is ejected. For example, the alarm unit 243 is one or more of buzzer, display and indicator lamp.

For example, in a case that the elastic block 132 is reset, the alarm unit 243 is further configured for stopping sending out the alarm information and outputting a signal that the elastic block 132 is reset to the control module 22, so that the control module 22 controls the electromagnet 231 of the electrically controlled limit structure 23 to be powered off so as not to adsorb the limit block 233, and then the limit block 233 once again locks the buffer structure by limiting the position of the buffer structure.

Figure 6:
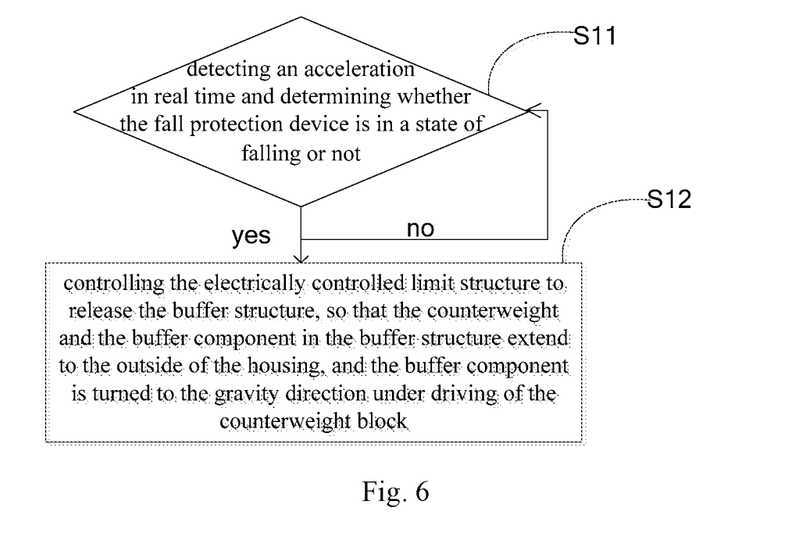
FIG. 6 is a flow diagram of a fall protection control method provided by at least one embodiment of the present disclosure.

With reference to FIG. 6, at least one embodiment of the present disclosure further provides a fall protection control method used for the fall protection device provided in any one of the embodiments described above, and the control method includes: step S11, detecting an acceleration in real time and determining whether the fall protection device 2 (as illustrated in FIG. 2A) is in a state of falling or not; and in a case that the fall protection device 2 is in a state of falling, performing the following up step S12, that is: in a case that the fall protection device is in a state of falling (accordingly, the object to be protected is in a state of falling), the electrically controlled limit structure 23 is controlled to release the buffer structure 1, so that the counterweight 12 and the buffer component 13 in the buffer structure 1 extend to the outside of the housing 21 of the fall protection device 2, and the buffer component 13 of the buffer structure 1 is turned to the gravity direction under driving of the counterweight 12.

In at least one embodiment of the present disclosure, the acceleration sensor of the detection module 24 is used for detecting the acceleration of the fall protection device 2 in real time, and the detection module 24 determines whether the fall protection device is in a state of falling or not according to the acceleration. For example, the acceleration sensor is provided by the fall protection device, or the acceleration sensor may also be provided by the object to be protected. By using the acceleration sensor provided by the object to be protected to determine whether the mobile terminal is in a state of falling or not, the acceleration sensor is realized based on the existing device of the object to be protected without an additional hardware, which is beneficial for popularization and application.

For example, in at least one embodiment of the present disclosure, the acceleration at which the fall protection device moves is obtained by the acceleration sensor in the detection module. In a case that the acceleration of the fall protection device is greater than or equal to a preset threshold, it is determined that the fall protection device is in a state of falling.

For example, the threshold is the gravity acceleration (also called as a free falling acceleration) g. In a case that the acceleration of the fall protection device is greater than or equal to the gravity acceleration, the fall protection device is in a state of free falling, and it is determined that the fall protection device is in a state of falling. In a case that the acceleration of the fall protection device is less than the gravity acceleration, the fall protection device is in a state of non-falling in the moment, and it is determined that the fall protection device is in a state of non-falling.

In at least one embodiment of the present disclosure, in a case that the fall protection device is in a state of falling, the detection module outputs a control signal to the control module so that the electrically controlled limit structure is controlled to release the buffer component in the buffer structure. After the buffer component is ejected, the counterweight drives the buffer component to turn in the gravity direction. In the process that the object to be protected falls on the ground, the elastic block of the buffer component contacts the ground firstly and plays a role of buffering to protect the object to be protected.

In at least one embodiment of the present disclosure, in a case that the fall protection device is not in a state of falling, returning to the previous step S11, that is, continually detecting the acceleration in real time and determining whether the fall protection device is in a state of falling or not.

Figure 7:
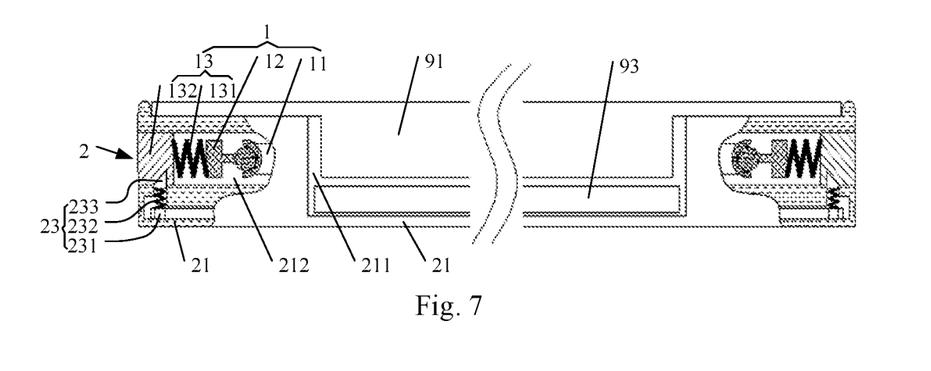
FIG. 7 is a schematic view of a structure of a mobile terminal provided by at least one embodiment of the present disclosure.

At least one embodiment of the present disclosure further provides a mobile terminal, as illustrated in FIG. 7, the mobile terminal includes a mobile terminal body 91 and the fall protection device 2 described in any one of the above embodiments, and the fall protection device 2 is arranged outside the mobile terminal body 91, so that the mobile terminal body 91 is embedded in the concave cavity 211 of the fall protection device 2.

For example, the mobile terminal further includes a battery 93 disposed between the mobile terminal body 91 and the housing 21 of the fall protection device 2.

For example, the mobile terminal body 91 includes a display module, for example, the display module includes a display panel and a backlight source that provides backlight for the display panel, or the display module includes a display panel with an active luminescence capability.

In at least one embodiment of the present disclosure, the ejecting direction of the buffer component 13 in the buffer structure 1 is parallel to the display panel of the mobile terminal (for example, parallel to the upper surface of the mobile terminal body 91). In a case that the buffer component 13 is ejected along the direction parallel to the display panel of the mobile terminal, it effectively prevents the contact between the sides of the mobile terminal and the ground, and reduces the damage to the external surface of the mobile terminal.

In combination with the above embodiments, the greatest beneficial effect of the embodiments of the present disclosure is: the embodiments of the present disclosure provides a buffer structure having a buffer component; in a case that the object to be protected is in a state of falling, the buffer component is ejected, the counterweight 12 is driven by the buffer component 13 to move outside of the housing, the counterweight automatically turns according to the falling direction of the object to be protected, and the elastic block of the buffer component is turned in the gravity direction under the driving of the counterweight. In a case that the object to be protected falls in any directions, the buffer component falls along a direction inclined to a contact surface; in the process that the object to be protected falls on the contact surface, the elastic block contacts the contact surface (for example, the ground) firstly, and plays a role of buffering.

In the fall protection device provided by at least one embodiment of the present disclosure, the detection module detects the acceleration of the fall protection device in real time and determines whether the fall protection device is in a state of falling or not; in a case that the fall protection device is detected to be in a state of falling, the detection module outputs a control signal to the control module so that the electrically controlled limit structure is controlled to release the buffer component of the buffer structure. After the buffer component is ejected, the elastic block of the buffer component contacts the ground firstly, at a moment when the object to be protected falls on the ground, the elastic block absorbs impulse generated during the process that the object to be protected falls off, and the instantaneous impact stress acted on the object to be protected is reduced, in this way, the buffer structure plays a role of buffering. In a case that the fall protection device is used in an electronic device, the whole machine and the internal modules of the electronic device are protected by the fall protection device. On the other hand, as a contacting area of the elastic block with the ground is relatively large, the buffer effect is relatively good, the phenomenon of stress concentration does not appear, and thus the effect of protecting the object to be protected is relatively good.

In the fall protection device provided by at least one embodiment of the present disclosure, after the buffering component in the buffer structure is ejected outside of the housing, and the buffer component is turned to the gravity direction under driving of the counterweight, alert information is issued to remind a user to reset the buffer component manually. In a case that the buffer component is reset, the alarm is stopped and a reset signal is output so that the buffer component limits the position of the electrically controlled limit structure again, which enhances the flexibility of the fall protection device in the embodiment of the present disclosure.

The embodiments of present disclosure avoid instantaneous impact from the contact surface which is caused by accidental falling in using the electronic device or the like, and avoids the damage to the system and internal modules of the electronic device or the like. The fall protection device provided by the embodiments of the present disclosure has a better buffer effect, protects the electronic device relatively well, and avoids the broken screen and the damage to the internal modules caused due to falling of the electronic device; also, the phenomenon of stress concentration does not appear, and the cost is low, which helps to improve the user's experience.

In at least one embodiment of the present disclosure, the buffer structure is located at at least one bent portion (such as four corners) of the object to be protected (such as an electronic device). In a case that the object to be protected falls off, the bent portion damages most likely in falling on the ground, and the buffer structure arranged at the bent portion is better for protecting the object to be protected.

In at least one embodiment of the present disclosure, the counterweight and the connecting rod of the buffer structure are connected with each other by the steering ball head and the ball seat, such design ensures that the counterweight turns around the ball seat, in the gravity direction and to the vertical direction or the maximum angle allowed by the ball seat in a case that the buffer component is ejected and the center of gravity of the counterweight changes, in this way, a relatively good protection effect is achieved.

The buffer structure, the fall protection device, the control method of the fall protection device, and the mobile terminal provided by the embodiments of the present disclosure are cross referenced.

What are described above is related to only the illustrative embodiments of the disclosure and not limitative to the scope of the disclosure. The scopes of the disclosure are defined by the accompanying claims.

What is claimed is:

1. A fall protection device, comprising:
    a buffer structure, wherein the buffer structure comprises a connecting rod, a counterweight which is in a rotatable connection with the connecting rod, and a buffer component connected with the counterweight;
    a housing, wherein the housing is provided with a concave cavity for holding an object to be protected and a guiding cavity, the buffer structure is arranged in the guiding cavity in an extendable and retractable manner, and the counterweight and the buffer component in the buffer structure are capable of extending to an outside of the housing along the guiding cavity;
    a control module that the housing is provided with;
    a detection module for real-time detecting of an acceleration, wherein the detection module is at the housing and is electrically connected with the control module; and
    an electrically controlled limit structure electrically connected with the control module, wherein the electrically controlled limit structure is configured to lock the buffer structure by limiting a position of the buffer structure or to release the buffer structure under control of the control module.

2. The device according to claim 1, wherein an outer edge of the housing is provided with a bent portion, and the bent portion is provided with the buffer structure.

3. The device according to claim 2, wherein the connecting rod of the buffer structure is an extendable and retractable connecting rod; and an end, away from the counterweight, of the connecting rod is fixedly connected with the guiding cavity.

4. The device according to claim 2, wherein the electrically controlled limit structure further comprises an electromagnet, a limit spring and a limit block, an end of the limit spring is connected with the electromagnet, and another end of the limit spring is connected with the limit block.

5. The device according to claim 4, wherein the buffer component comprises an elastic block and a buffer spring, an end of the buffer spring is connected with the elastic block, and another end of the buffer spring is connected with the counterweight; and wherein the elastic block is provided with a locking groove which allows the limit block to be inserted to lock the buffer structure by limiting the position of the buffer structure.

6. The device according to claim 2, wherein in the buffer structure, the connecting rod is in the rotatable connection with the counterweight through a steering ball head and a ball seat which matches the steering ball head.

7. The device according to claim 1, wherein the housing has a rectangular structure, and each of four corners of the rectangular structure is provided with the buffer structure.

8. The device according to claim 1, wherein the connecting rod of the buffer structure is an extendable and retractable connecting rod, and an end, away from the counterweight, of the connecting rod is in the guiding cavity and is fixedly connected with the guiding cavity.

9. The device according to claim 1, wherein the electrically controlled limit structure further comprises an electromagnet, a limit spring and a limit block, an end of the limit spring is connected with the electromagnet, and another end of the limit spring is connected with the limit block.

10. The device according to claim 9, wherein the limit block is provided with a ferromagnet which matches the electromagnet.

11. The device according to claim 9, wherein the buffer component comprises an elastic block and a buffer spring, an end of the buffer spring is connected with the elastic block, and another end of the buffer spring is connected with the counterweight; and wherein the elastic block is provided with a locking groove which allows the limit block to be inserted to lock the buffer structure by limiting the position of the buffer structure.

12. The device according to claim 9, wherein the housing is further provided with a receiving groove communicating with the guiding cavity, and the limit block is arranged in the receiving groove in an extendable and retractable manner under action of the limit spring.

13. The device according to claim 1, wherein in the buffer structure, the connecting rod is in the rotatable connection with the counterweight through a steering ball head and a ball seat which matches the steering ball head.

14. A fall protection control method of the fall protection device according to claim 1, comprising:
    detecting an acceleration in real time and determining whether the fall protection device is in a state of falling according to the acceleration, wherein in a case that the acceleration of the fall protection device is determined to be greater than or equal to a preset threshold, it is determined that the fall protection device is in the state of falling; and
    in a case that the fall protection device is in the state of falling, controlling the electrically controlled limit structure to release the buffer structure, so that the counterweight and the buffer component in the buffer structure extend to the outside of the housing, and the buffer component of the buffer structure is turned to the gravity direction under driving of the counterweight.

15. The method according to claim 14, wherein the threshold is the gravity acceleration.

16. A mobile terminal, comprising a mobile terminal body and the fall protection device according to claim 1, wherein the mobile terminal body comprises a portion in the concave cavity in the fall protection device.

* * * * *